United States Patent
Jiao et al.

(10) Patent No.: US 11,473,207 B2
(45) Date of Patent: Oct. 18, 2022

(54) PREPARING METHOD FOR TITANIUM OF TI—C—S ANODE BY CARBONIZED/SULFURIZED ILMENITE

(71) Applicant: UNIVERSITY OF SCIENCE AND TECHNOLOGY BEIJING, Beijing (CN)

(72) Inventors: Shuqiang Jiao, Beijing (CN); Donghua Tian, Beijing (CN); Handong Jiao, Beijing (CN)

(73) Assignee: UNIVERSITY OF SCIENCE AND TECHNOLOGY BEIJING, Beijing (CN)

( * ) Notice: Subject to any disclaimer, the term of this patent is extended or adjusted under 35 U.S.C. 154(b) by 381 days.

(21) Appl. No.: 16/619,892

(22) PCT Filed: Feb. 28, 2019

(86) PCT No.: PCT/CN2019/076500
§ 371 (c)(1),
(2) Date: Dec. 5, 2019

(87) PCT Pub. No.: WO2020/098176
PCT Pub. Date: May 22, 2020

(65) Prior Publication Data
US 2020/0378020 A1  Dec. 3, 2020

(30) Foreign Application Priority Data
Nov. 16, 2018 (CN) .......................... 201811368088.7

(51) Int. Cl.
*C25C 5/04* (2006.01)
*C25C 3/28* (2006.01)
(Continued)

(52) U.S. Cl.
CPC .................. *C25C 3/28* (2013.01); *C22C 1/05* (2013.01); *C23C 8/08* (2013.01); *C25C 7/025* (2013.01)

(58) Field of Classification Search
CPC .... C25C 3/28; C25C 5/04; C25C 3/00; C25C 7/005; C25C 3/26; C25C 7/06; C25C 7/025; C25C 7/00
See application file for complete search history.

(56) References Cited

FOREIGN PATENT DOCUMENTS

| CN | 1712571 A | 12/2005 |
|---|---|---|
| CN | 101187042 A | 5/2008 |

(Continued)

*Primary Examiner* — Zulmariam Mendez
(74) *Attorney, Agent, or Firm* — Novick, Kim & Lee, PLLC; Allen Xue

(57) ABSTRACT

Provided is a method for preparing metallic titanium by anode-electrolysis of carbonized/sulfurized ilmenite, and relates to the technical field of mineral processing and electrochemical extraction of metallic titanium in molten salts in non-ferrous metallurgy. The method uses titanium-containing ore, carbon (C) and sulfur (S) as raw materials and prepares a Ti—C—S/titanium sulfide anode material with high electric conductivity through a sintering reaction, and then uses the Ti—C—S/titanium sulfide anode to prepare metallic titanium in a molten salt electrolyte system successfully. With the Ti—C—S composite soluble anode in the present invention, metallic titanium is deposited at the cathode and $CS_2/S_2$ gas is generated at the anode in the molten salt electrolysis process; in addition, the gas can be used as a raw material to effectively treat the ore to prepare titanium sulfide.

10 Claims, 4 Drawing Sheets

(51) Int. Cl.
*C22C 1/05* (2006.01)
*C23C 8/08* (2006.01)
*C25C 7/02* (2006.01)

(56) References Cited

FOREIGN PATENT DOCUMENTS

| | | | | |
|---|---|---|---|---|
| CN | 100415940 | C | 9/2008 | |
| CN | 101519789 | A | 9/2009 | |
| CN | 101914788 | B | 10/2012 | |
| CN | 103451682 | A | 12/2013 | |
| CN | 106868550 | A | 6/2017 | |
| CN | 109280941 | * | 1/2019 | ............... C25C 3/28 |
| JP | 2017043819 | A | 3/2017 | |
| WO | 2005019501 | A2 | 3/2005 | |

* cited by examiner

PREPARING METHOD FOR TITANIUM OF TI—C—S ANODE BY CARBONIZED/SULFURIZED ILMENITE

FIELD OF THE INVENTION

The invention relates to the technical field of non-ferrous metal extraction, in particular to a method for preparing titanium of Ti—C—S anode with carbonized/sulfurized ilmenite.

BACKGROUND OF THE INVENTION

Owing to its excellent physical and chemical properties, metallic titanium is widely used in aviation, aerospace, petroleum, chemical, automobile, medical equipment, civilian construction and other fields, and is always reputed as a "future metal" or "strategic metal", etc.

Nowadays, the industrial production process of metallic titanium is mainly based on the Kroll method, i.e., a method of titanium tetrachloride reduction with metallic magnesium. The mainly process is to place metallic magnesium into a reactor and heat it up to 800-900° C. first, and then add $TiCl_4$ at a certain rate to prepare titanium with purity of about 99.7%. However, the metallurgical production process is complex, energy-intensive, high-cost, and requires high-purity titanium tetrachloride. As a result, the production cost of metallic titanium is very high, which severely limits the extensive application of metallic titanium in the civilian market.

In order to develop a process that can effectively replace the Kroll method, researchers have published literatures about the preparation of titanium. In 2000, Professor D. F. Fray of the University of Cambridge in the United Kingdom proposed to use sintered $TiO_2$ as the cathode, a graphite rod as the anode and carried out an electro-deoxidation process in $CaCl_2$ molten salts, which was referred to as FFC Cambridge Process (WO09963638). At present, the process has not been applied in industrial production, mainly due to the following factors: (1) the current efficiency is low; (2) the cathode deoxidation process is complex; (3) the required purity of $TiO_2$ is high. In addition to the FFC process, in 2002, the Okabe and Ono research groups of Kyoto University in Japan reduced $TiO_2$ into metallic titanium by using Ca obtained by electrolysis of $TiO_2$ in a molten salt of calcium chloride. The process obtained metallic titanium by reducing $TiO_2$ with metallic calcium decomposed by cathodic electrolysis. At present, the process is not applied in industrial application, mainly because it has problems such as low current efficiency, high oxygen content in the product, and high requirements for the titanium dioxide raw material, etc. Both of the two processes were directed to the study on cathodes in electrolytic cell systems.

Professor Sadoway of the Massachusetts Institute of Technology successfully obtained liquid metallic titanium by electrolyzing oxidemolten salts containing $TiO_2$ oxide at 1,700° C. Although the process was simple, supported continuous production, and obtained $O_2$ at the anode at the same time, the electrolysis temperature in the process was extremely high, posing a great challenge to the materials of the crucible and anode used in the process, resulting in high production costs. Otherwise, the titanium obtained at the cathode was at the bottom of the molten salt slag; consequently, the obtained titanium had high oxygen content, and it was difficult to separate the titanium from the oxide slag. Therefore, at present, the process still can be used to obtain metallic titanium by electrolysis in industrial production.

The researches on soluble anodes were started in the 1950s in the last century, but all of them were directed to the titanium carbide series anodes. Around the 1950, Professor E. Wainer used TiC and TiO as raw materials, mixed them, and then treated the mixture by electric arc furnace melting at 2,100° C. to form a TiC—TiO solid solution, and used the material as an anode for electrolysis in a chloride solution. It has been found that CO gas was generated by the anode region and no anode mud was produced in the molten salt, and after long-time electrolysis, metallic titanium was deposited on the cathode electrode.

Japanese scholar Y. Hashimoto prepared oxygen-doped titanium carbide by electric arc melting in a mixture of $TiO_2$ and excessive C, and used the titanium carbide as the anode and carried out electrolysis in molten salts for a long time to prepare metallic titanium at the cathode. However, the anode preparation process still relies on a high-temperature (1,700° C.) reduction condition, and a long-time electrolysis may result in circuit between the anode and the cathode and the generation of anode mud if the C content is too high.

MER Corporation in USA has developed a new electrolytic reduction process (WO2005/019501). The process is to mix $TiO_2$ and C at a stoichiometric ratio, obtain a mixture of titanium suboxides and carbon by thermal reduction at 1,100° C.-1,300° C. temperature, and then use the mixture as a complex anode and carry out electrolysis in a chloride molten salt electrolyte; thus, metallic titanium is obtained successfully. The composite anode in the process is a mixed material of carbon and suboxides, anode mud and residual carbon are produced in the process of electrochemical dissolution, and there is also a problem of short circuit between the electrodes in long-time of electrolysis.

In 2005, an electrochemical metallurgy group from Beijing University of Science and Technology proposed a new clean titanium extraction process (ZL200510011684.6), which used titanium dioxide and graphite as raw materials to prepare a highly conductive $Ti_2CO$ soluble anode by carbon thermal reduction under a vacuum condition at 1,500° C., and then used chloride molten salts electrolysis system at 700° C. and obtained high-purity titanium with oxygen content lower than 300 ppm on the cathode successfully. In the subsequent process improvement and research process, the group proposed to use $TiC_xO_yN_z$ ($0<X \leq Y<1$, $0<Z<1$, $x+y+z=1$) as the electrode material for a soluble anode, and obtained metallic titanium successfully at the cathode with the material (CN201310421132.7). The process will be further promoted for industrial application.

Sichuan Panzhihua Iron and Steel Group Co., Ltd. applied for a patent for a method for preparing metallic titanium by titanium electrolysis in a circulating molten salt in 2009 (CN101519789A), which used $TiCl_4$ as the raw material, reduced low-valent titanium chloride with metallic iron, and then obtained metallic titanium by molten salt electrolysis. The method had the following disadvantages: the cost of the raw materials was quite high, titanium tetrachloride and metallic titanium were also used, and the reduction rate of titanium tetrachloride ($TiCl_4$) was low. Additionally, in 2010, the company applied for a patent about a method for preparing metallic titanium (CN101914788), which smelted titanium slag with titanium concentrate and then directly added excessive C and charged $N_2$ to prepare titanium carbide or titanium carbonitride. The method also had the following problems: since the carbon added in the process is excessive, residual carbon still existed in the electrolysis process and the carbon content in the product was out-of-specification.

In 2011, a research group led by Professor D. F. Fray of Cambridge University proposed a Chinuka process (U.S. Pat. No. 9,181,604B2), which used a Ti—C—O anode in the process; thus, carbon monoxide gas was released at the anode and metallic titanium was recovered at the cathode during electrolysis process. The process may be used to treat low-grade titanium-bearing ores.

All of the processes of electrolytic preparation of metallic titanium in molten salts are based on titanium oxide. Owing to the fact that titanium has strong affinity with oxygen and Ti—O is easy to form solid solution, the oxygen content in the obtained titanium product is too high. It will be beneficial to prepare low-oxygen titanium if the use of oxides can be avoided. However, the dissolvability of sulfur in titanium is very low (about 0.02 at. %), does not form a solid solution, and is easier to separate. The research made by a Japanese scholar R. O. Suzuki has indicated that carbon disulfide gas can be used to effectively reduce titanium-containing ore materials and prepare titanium disulfide ($TiS_2$). However, all of the previous researches are mainly focused on of the reduction of carhode and did not report on anode.

In summary, the processes for preparing metallic titanium in the prior technology has many disadvantages such as long process flow, high energy consumption, product quality inferior to the criteria for high-purity titanium, or inapplicability to industrial production and application, etc.

In order to achieve high-efficiency utilization of titanium ore and solve the problems in existing titanium preparation processes, the present invention proposes to directly treat ilmenite with carbon disulfide, sinter the obtained titanium sulfide and titanium carbide to prepare a Ti—C—S anode, and use the anode for electrochemical metallurgy to extract titanium, wherein, the carbon disulfide and $S_2$ gasses produced by the anode can be effectively recycled and used to treat the titanium-containing raw materials, so as to achieve efficient cyclic utilization of energy and resources.

SUMMARY OF THE INVENTION

In view of the above problems, the present invention provides a method for preparing metallic titanium by Ti—C—S soluble anode of carbonized/sulfurized ilmenite, which directly treats ilmenite with carbon disulfide, sinters the obtained titanium sulfide and titanium carbide to prepare a Ti—C—S anode, and use the anode for electrochemical metallurgy to extract titanium, wherein the carbon disulfide ($CS_2$) and $S_2$ gasses produced by the anode can be effectively recycled and used to treat the titanium-containing raw materials, and thereby efficient cyclic utilization of energy and resources and continuous production of high-purity titanium are achieved.

In one aspect, the present invention provides a method for preparing metallic titanium by Ti—C—S anode of carbonized/sulfurized ilmenite, which comprises the following steps:
S1: sulfurizing a mixture comprising a titanium-containing material, a carbon-containing reducer and a sulfur reducer to prepare titanium sulfide;
S2: using the titanium sulfide and titanium carbide as raw materials to prepare a Ti—C—S composite;
S3: using the titanium sulfide or the Ti—C—S composite as an anode, and using electrochemical electrolysis to extract metallic titanium at the cathode;
S4: collecting $CS_2$ and $S_2$ gasses generated by the anode during the electrolysis and using them for sulfurizing the titanium-containing material.

According to any possible embodiment in the aspect described above, another implementation is further provided, wherein the mixture is specifically a mixture obtained by homogenously mixing the titanium-containing material, the carbon-containing reducer, and the sulfur reducer at a molar ratio of 1:2.0:2.0-1:2.5:3.0.

According to any possible embodiment in the aspect described above, another embodiment is further provided, wherein the conditions of the sulfurization reaction in the step S1 include: burning reaction shielded by an inert atmosphere, temperature range in the reaction is 700° C.-1,600° C., and reaction time range is 30 min.-900 min.

According to any possible embodiment in the aspect described above, another embodiment is further provided, wherein, the titanium sulfide and the titanium carbide are vacuum-sintered to prepare the Ti—C—S composite in the step S2.

According to any possible embodiment in the aspect described above, another embodiment is further provided, wherein, during the electrolysis in the step S3, the electrolysis temperature is 70° C.-1,600° C., the spacing between the cathode and the anode is 1 cm-50 cm, the voltage range of the electrolytic cell is 0.5 V-10.0 V, the anode current density range is 0.05 A/cm$^2$-1.50 A/cm$^2$, and the cathode current density range is 0.05 A/cm$^2$-1.50 A/cm$^2$, respectively.

According to any possible embodiment in the aspect described above, another embodiment is further provided, wherein the electrolyte used in the electrolysis in the step S3 is a salt mixture composed of one or more of $CsCl_2$, $CaCl_2$, LiCl, NaCl, KCl, $MgCl_2$, $AlCl_3$, CaF, NaF, KF, and LiF and one or more of $TiCl_3$, $TiCl_2$, $K_2TiF_6$, and $Na_2TiF_6$.

According to any possible embodiment in the aspect described above, another embodiment is further provided, wherein the mass percent of titanium ions in the electrolyte is 1%-10%.

According to any possible embodiment in the aspect described above, another embodiment is further provided, wherein the titanium-containing material is one or more of rutile type titanium white, anatase type titanium white, titanium concentrate, titanium nitride, titanium carbide, titanium-carbon oxides, titanium-carbon-nitrogen oxides, ilmenite, vanadium titano-magnetite, blast furnace type high titanium slag, high titanium slag, and titanium suboxides.

According to any possible embodiment in the aspect described above, another embodiment is further provided, wherein the carbon-containing reducer is one or more of carbon, activated carbon, graphite powder, charcoal, petroleum coke, bitumen, and coal char particles.

According to any possible embodiment in the aspect described above, another embodiment is further provided, wherein the cathode is one or more of metallic titanium, stainless steel, carbon steel, metallic molybdenum, and metallic nickel.

Compared with the prior process, the present invention can attain the following technical effects: compared with existing soluble anodes, with the Ti—C—S anode metallic titanium is directly deposited and obtained on the cathode in the electrolysis, and the $CS_2/S_2$ gas generated by the anode is recycled and efficiently utilized for energy circulation, no anode mud is produced in the entire electrolysis process, and continuous electrolysis is carried out; thus, the metallic titanium extraction cost is greatly reduced, and the titanium-containing ore resource is efficiently utilized.

Of course, the implementation of any of the products in the present invention may not necessarily attain all of the technical effects described above at the same time.

BRIEF DESCRIPTION OF DRAWINGS

To make the technical scheme in the embodiments of the present invention understood better, hereunder the accompanying drawings used in the embodiments will be introduced briefly. Apparently, the accompanying drawings described below only illustrate some embodiments of the present invention. Those having ordinary skills in the art can obtain other drawings on the basis of these drawings without expending any creative labor.

DETAILED DESCRIPTION OF THE EMBODIMENTS

To make the technical scheme of the present invention understood better, hereunder some embodiments of the present invention will be detailed with reference to the accompanying drawings. It should be noted that the described embodiments are only a part of the embodiments of the invention rather than all embodiments of the present invention. Those having ordinary skills in the art can obtain other embodiments without expending any creative labor on the basis of the embodiments provided here; however, all these embodiments shall be deemed as falling into the scope of protection of the present invention.

The terms used in the embodiments of the present invention are only for the purpose of describing particular embodiments only, are not intended to limit the present invention. The singular forms "a", "an" and "the" used in the embodiments of the present invention and the attached claims are also intended to encompass plural forms, unless otherwise specified clearly in the context.

Figure 1:
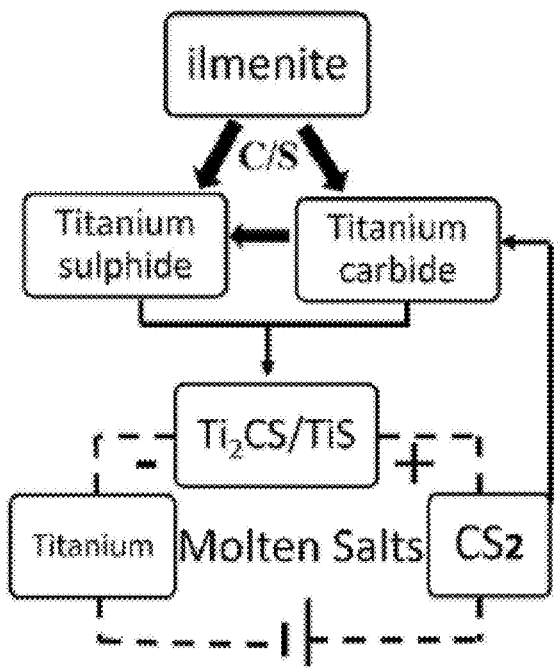
FIG. 1 is a flow chart of the method for preparing metallic titanium by anode-electrolysis of carbonized/sulfurized ilmenite provided in an embodiment of the present invention.

FIG. 1 is a flow chart of the method for preparing metallic titanium by anode-electrolysis of carbonized/sulfurized ilmenite provided in an embodiment of the present invention. As shown in FIG. 1, a method for preparing metallic titanium by anode-electrolysis of carbonized/sulfurized ilmenite comprises the following steps:

Step (1): Preparation of Titanium Sulfide

A titanium-containing material, a carbon-containing reducer and a sulfur reducer are homogeneously mixed at a molar ratio of 1:2.0:2.0-1:2.5:3.0, the mixture is used as a raw material, and a burning reaction is performed in a sealed pressure-resistant high-temperature container, so that the mixture is completely sulfurized to prepare a titanium sulfide product with high electric conductivity. An inert atmosphere is used for shielding during the high-temperature and high-pressure burning reaction. The temperature is held at 700° C.-1,600° C., reaction time is 30-900 min.; preferably the temperature is 1,000° C.-1,300° C., and the reaction time is 60-300 min.; thus, sulfides with high electric conductivity, such as $TiS_2$, $TiS$, $Ti_2S$, $Ti_3S$, $Ti_6S$ and $Ti_4S_5$, are successfully prepared. Wherein, the titanium-containing material comprises one or more of rutile type titanium white, anatase type titanium white, metatitanic acid, ilmenite, vanadium titano-magnetite, blast furnace type high titanium slag, high titanium slag and titanium suboxides; the carbon-containing reducer comprises one or more of carbon, activated carbon, graphite powder, charcoal, petroleum coke, bitumen, and coal char particles; the sulfur is sulfur powder for industrial use. The prepared titanium sulfide is composed of titanium disulfide and a trace amount of other sulfides. The titanium sulfide is subjected to high-temperature sintering or electric arc furnace melting to form a solid solution, and the solid solution is used as an anode for electrochemical electrolysis to prepare metallic titanium. The relevant reaction mechanism involved is:

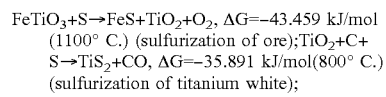
$FeTiO_3+S \rightarrow FeS+TiO_2+O_2$, $\Delta G=-43.459$ kJ/mol (1100° C.) (sulfurization of ore); $TiO_2+C+S \rightarrow TiS_2+CO$, $\Delta G=-35.891$ kJ/mol(800° C.) (sulfurization of titanium white);

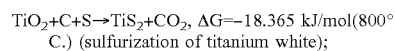
$TiO_2+C+S \rightarrow TiS_2+CO_2$, $\Delta G=-18.365$ kJ/mol(800° C.) (sulfurization of titanium white);

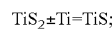
$TiS_2 \pm Ti = TiS$;

$TiO_2+2C+S \rightarrow TiS+2CO$ $\Delta G=-17.949$ kJ/mol (1100° C.);

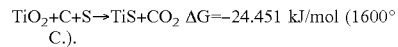
$TiO_2+C+S \rightarrow TiS+CO_2$ $\Delta G=-24.451$ kJ/mol (1600° C.).

Step (2): Preparation of Ti—C—S Anode

The titanium sulfide and titanium carbide prepared in the step (1) are used as raw materials and subjected to vacuum sintering, to prepare a Ti—C—S anode ($Ti_2C_xS_{1-x}$, $X \leq 0.5$); the Ti—C—S anode contains titanium sulfide and titanium, carbon and sulfur, which are collectively referred to as a Ti—C—S composite. Wherein, the Ti—C—S anode is prepared from titanium sulfide and titanium carbide or titanium sulfide and carbon raw materials at stoichiometric ratios according to the following reactions respectively:

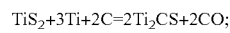
$TiS_2+3Ti+2C=2Ti_2CS+2CO$;

$TiS+TiC=Ti_2CS$;

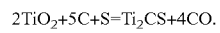
$2TiO_2+5C+S=Ti_2CS+4CO$.

Step (3): Electrochemical Electrolysis for Preparing Metallic Titanium

The titanium sulfide prepared in the step (1) or the Ti—C—S prepared in the step (2) is used as an anode, and metallic titanium is extracted by electrochemical electrolysis. In the reaction, the cathode product is mono-phase metallic titanium; the anode produces $CS_2$ and $S_2$ gasses, which are recycled to realize cyclic utilization; the relevant reaction mechanism involved in the electrochemical electrolysis is:

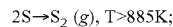
$2S \rightarrow S_2$ (g), T>885K;

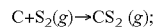
$C+S_2(g) \rightarrow CS_2$ (g);

The overall reaction is: $TiS \rightarrow Ti+S_2(g)$;

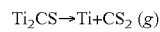
$Ti_2CS \rightarrow Ti+CS_2$ (g)

The Ti—C—S electrode obtained in the step (1) and the step (2) is used to perform an electrochemical smelting process to extract metallic titanium in a molten salt electrolyte system. $CS_2$ and $S_2$ gasses are produced at the anode and metallic titanium is obtained at the cathode in the electrolysis process; the cathode is formed of one or more of metallic titanium, stainless steel, carbon steel, metallic molybdenum, and metallic nickel. The $S_2$ and $CS_2$ gasses are used for preparation of titanium sulfide to achieve efficient and cyclic utilization of energy resources.

The electrolyte is composed of a molten salt electrolyte system (halide, halide-fluoride, fluoride, etc.); specifically, the molten salt electrolyte system is a salt mixture of one or more of $CsCl_2$, $CaCl_2$, $LiCl$, $NaCl$, $KCl$, $MgCl_2$, $AlCl_3$, $CaF$, $NaF$, $KF$, and $LiF$ and one or more of $TiCl_3$, $TiCl_2$, $K_2TiF_6$, and $Na_2TiF_6$, wherein the concentration of Ti ions in mass percentage in the molten salt electrolyte system is 1%-10%. The electrolyte holding container is one or more of stainless steel crucible, carbon steel crucible, titanium crucible, titanium alloy crucible, graphite crucible, ferro-manganese crucible, molybdenum crucible, and nickel crucible.

The cell voltage is controlled at 0.5 V-10.0 V, the anode current density range is 0.05 A/cm$^2$-1.50 A/cm$^2$, the cathode current density range is 0.05 A/cm$^2$-1.50 A/cm$^2$, the electrolysis temperature range is 70° C.-1,600° C., and the spacing between the anode and the cathode is controlled to 1 cm-50 cm. Preferably, the cell voltage is controlled at 1.5V-6.0V; the anode current density range is 0.05 A/cm$^2$-1.0 A/cm$^2$; the cathode current density range is 0.05 A/cm$^2$-1.0 A/cm$^2$; the electrolysis temperature ranges is 400° C.-900° C.; the spacing between the anode and the cathode is 3 cm-40 cm.

Step (4): Gas Recycling

The $CS_2$ gas recycled in the electrolysis in the step (3) is used to treat the titanium-containing ore to prepare titanium sulfide;

The titanium-containing ore comprises one or more of rutile type titanium white, anatase type titanium white, titanium concentrate, titanium nitride, titanium-carbon oxides, titanium-carbon-nitrogen oxides, metatitanic acid, ilmenite, vanadium titano-magnetite, blast furnace type high titanium slag, titanium carbide, titanium dioxide, high titanium slag and titanium suboxides;

$TiO_2+CS_2(g)\rightarrow TiS_2+CO/CO_2(g)$;

$TiC+CS_2(g)\rightarrow TiS_2+C$;

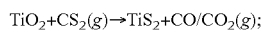

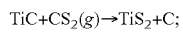

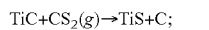

$TiO+CS_2(g)\rightarrow TiS+CO+S_2(g)$.

Embodiment 1

Figure 2A:
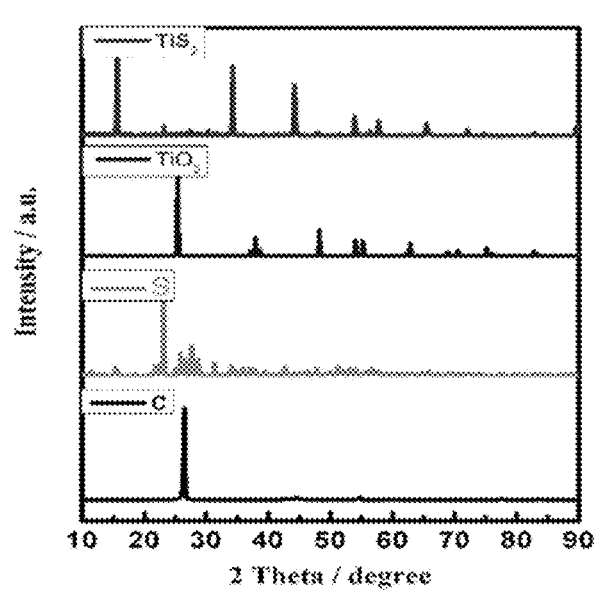
FIGS. 2A and 2B show X-ray diffraction patterns of the Ti—C—S anode synthesized and prepared in an embodiment of the present invention.
Figure 2B:
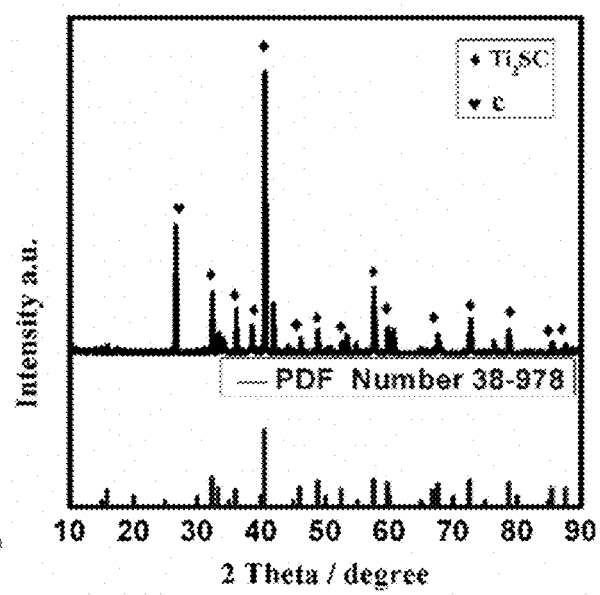
Figure 3:
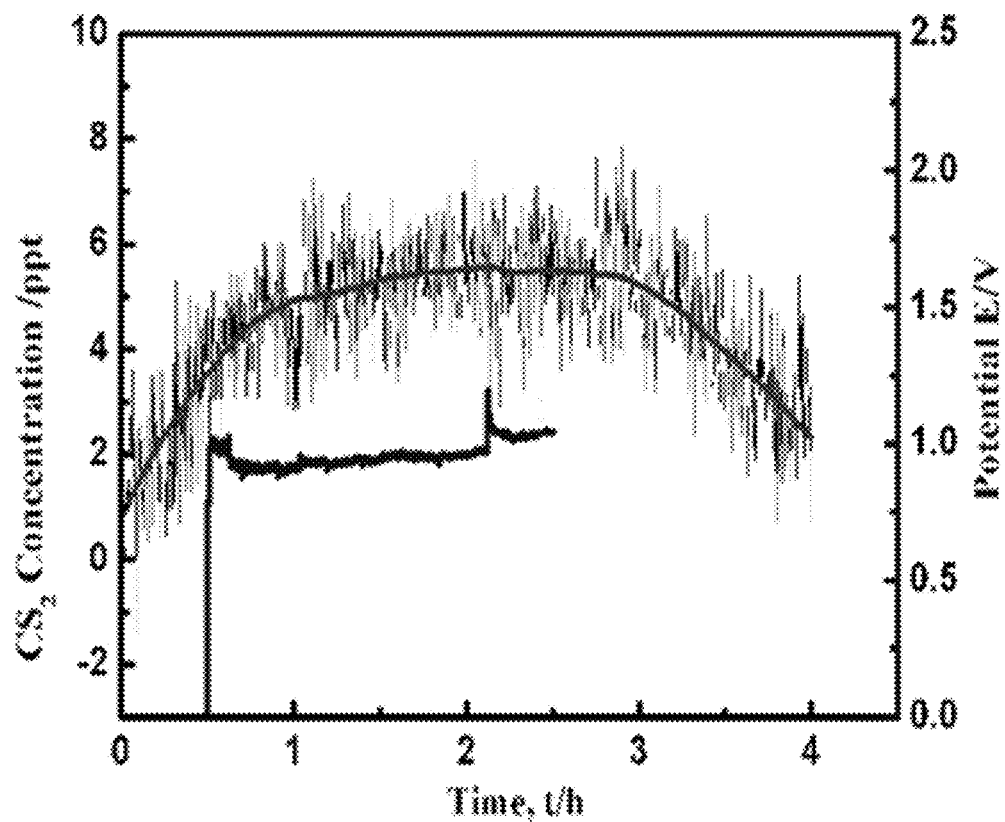
FIG. 3 shows a voltage-gas curve chart of the electrolytic process provided in an embodiment of the present invention.
Figure 4:
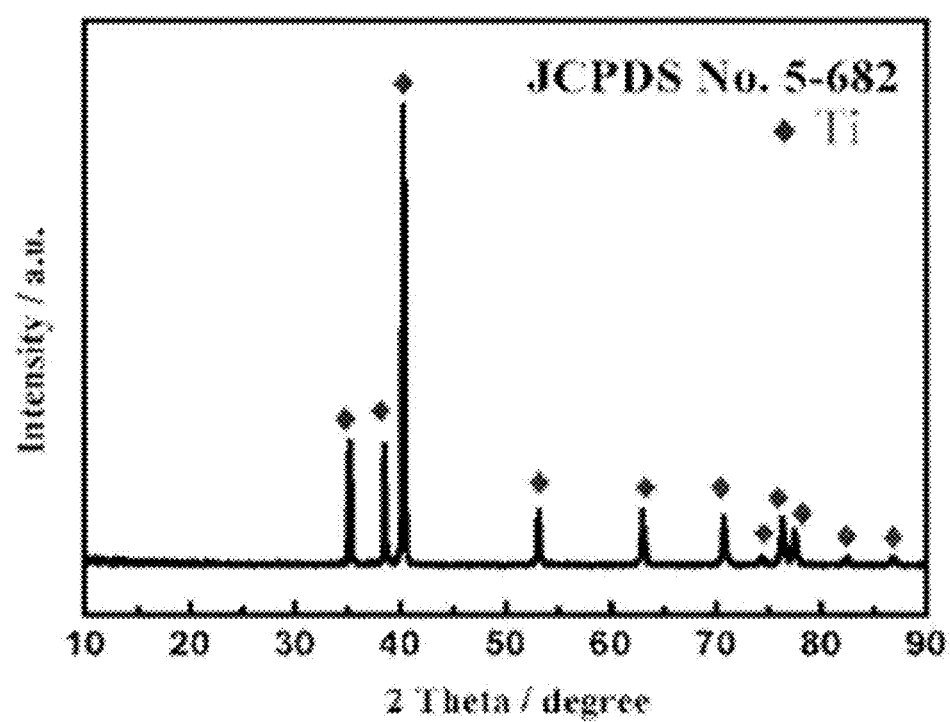
FIG. 4 shows an XRD image of the titanium product at the cathode provided in an embodiment of the present invention.
Figure 5:
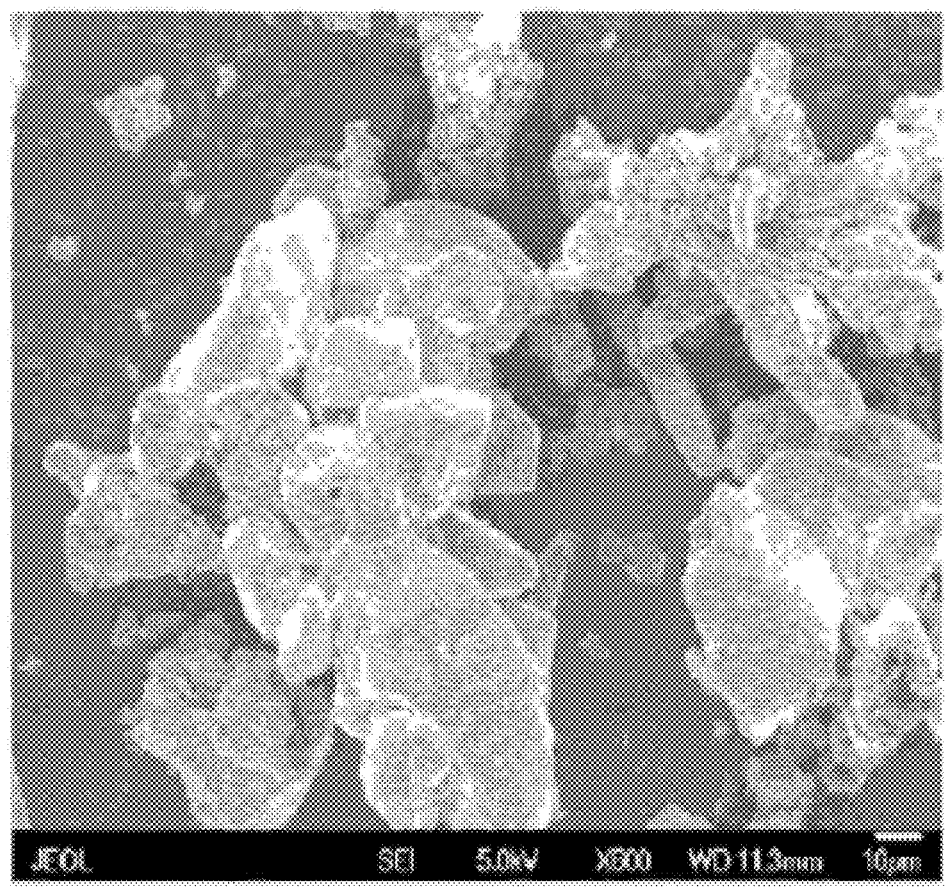
FIG. 5 shows a SEM image of the titanium product at the cathode provided in an embodiment of the present invention.

Titanium white ($TiO_2$, 99.5 wt %), graphite powder (99.95), and sulfur powder (99%) are mixed at a molar ratio of 1:2:2.1, in total amount of 100 g. The mixture is mixed and milled in a ball mill for 12 h, and 5 g mixture is taken and pressed into a small piece in dimensions of 5 mm diameter*5 mm under the 10 Mpa pressure, and is loaded into a closed glass tube with one end sealed, and the glass tube is sealed with high temperature-resistant organic glue to ensure the glass tube has no air leakage at high temperatures. Then the glass tube is placed in a muffle furnace, and burning reaction is performed at 1,000° C. for 10 h, and then the temperature is lowered to room temperature, and the glass tube is cut to take out the $TiS_2$ material. The titanium disulfide and titanium carbide are subjected to SPS sintering at 1450° C., and finally a $Ti_2CS$ ceramic material is synthesized. The XRD diffraction patterns of the synthetic material are shown in FIGS. 2A and 2B. Relevant electrolysis experiments are carried out at 750° C. in a corundum crucible containing 150 g NaCl—KCl eutectic molten salt. Wherein the cathode is a nickel rod in 2 mm diameter, the reference electrode is a AgCl/Ag electrode made of NaCl—KCl—AgCl (0.04 wt %), and the prepared $Ti_2CS$ is used as the anode. 0.4V (vs. Ag/AgCl) is applied for potentiostatic electrolysis for 4 h, and an anode atmosphere is charged into a tubular furnace filled with TiC powder to carry out reduction in the atmosphere to prepare $TiS_2$. After the electrolysis, the product on the nickel rod cathode is subjected to ultrasonic washing with distilled water and washing with 1 wt % hydrochloric acid (HCl); finally metallic titanium powder is obtained. FIG. 3 shows a voltage-gas curve chart of the electrolysis process in the present invention, FIG. 4 shows the XRD diffraction patterns of the product, and FIG. 5 shows an SEM image of the titanium at the cathode.

Embodiment 2

First, 500 g titanium concentrate $FeTiO_3$ is carbonized and sulfurized at 1,200° C., and the product obtained through the treatment is mixed powder of FeS and $Ti_2CS$. Then, the mixed powder is immersed in 1 mol/L dilute hydrochloric acid, vacuum-filtered, and then oven-dried at 80° C. to obtain Ti—C—S ceramic powder ($Ti_2CS$). The anode is vacuum-sintered to form a $Ti_2CS$ anode. Relevant electrolysis is carried out at 750° C. in a corundum crucible containing 150 g NaCl—KCl—$TiCl_2$ eutectic molten salt. Wherein the cathode is a nickel rod in 2 mm diameter, and the reference electrode is a AgCl/Ag electrode made of NaCl—KCl—AgCl (0.04 wt %). Galvanostatic electrolysis is carried out at 0.1 A/cm$^2$ current density for 4 h, the gas produced at the anode is charged into a high-temperature reactor containing $TiO_2$ to carry out reduction to prepare $TiS_2$ or TiS. Then the product at the cathode is subjected to ultrasonic washing with distilled water and washing with 1 wt % hydrochloric acid (HCl), and the final product is subjected to XRD detection; thus, mono-phase metallic titanium powder is obtained.

Embodiment 3

TiS and TiC are mixed at a molar ratio of 1:1, the mixture is mix and milled in a star ball mill for 12 h, and is subjected to vacuum sintering to prepare a $Ti_2CS$ anode. Relevant electrolysis experiments are carried out at 850° C. in a corundum crucible containing 150 g $CaF_2$—KF—NaF—$Na_2TiF_6$ eutectic molten salt. The sintered $Ti_2CS$ is used as the anode, galvanostatic electrolysis is carried out at 0.5 A/cm$^2$ anode current density, the spacing between the anode and the cathode is 5 cm; a titanium powder product is obtained on the nickel rod cathode after 4 h electrolysis. The gasses produced at the anode are charged into a tubular furnace filled with $Ti_2CO$ (at 1,500° C.), and the gasses produced in the electrolysis process are used to reduce $Ti_2CO$ to obtain a TiS product. The cathode product is immersed in distilled water and washed with 1 wt % dilute hydrochloric acid, and then is dried. The final product is titanium powder in a homogeneous phase.

Embodiment 4

First, 500 g vanadium-titanium magnetite obtained in Panxi Region is carbonized at 1,300° C., the product obtained through the treatment is immersed in 1 mol/L dilute hydrochloric acid, and is subjected to magnetic separation and vacuum filtration, and the final product is dried in an oven at 80° C. to obtain titanium carbide (TiC). The titanium sulfide (TiS) prepared by reduction with the gas in the embodiment 3 and the prepared TiC are mixed and milled in a star ball mill for 24 h, 5 g mixture is taken and pressed at 10 Mpa pressure into a small piece in dimensions of 10 mm diameter*10 mm, and is placed in a pressure-resistant and high temperature-resistant container, the container is loaded in a muffle furnace shielded by argon atmosphere, and the material is pressed and vacuum-sintered into a cylinder in dimensions of 10 mm diameter*20 mm. Relevant electrolysis experiments are carried out at 850° C. in a corundum crucible containing 150 g $CaF_2$—KF—NaF—$Na_2TiF_6$ eutectic molten salt. The sintered $Ti_2CS$ is used as the anode, galvanostatic electrolysis is carried out at 0.05 A/cm$^2$ cathode current density, the spacing between the anode and the cathode is 10 cm; a titanium powder product is obtained on the nickel rod cathode after 4 h electrolysis, and the anodic gas is charged into $Ti_2C_{0.25}O_{0.25}N_{0.5}$ mineral material for reduction to recover $TiS_2$. The cathode product is immersed in distilled water and washed with 1 wt % dilute hydrochloric acid, and then is dried. The final product is titanium powder in a homogeneous phase.

Embodiment 5

First, 500 g vanadium-titanium magnetite obtained in Panxi Region is sulfurized at 1,300° C., the product obtained through the treatment is immersed in 1 mol/L dilute hydrochloric acid, and is subjected to magnetic separation and vacuum filtration, and the final product is dried in an oven at 80° C. to obtain titanium white ($TiO_2$). The titanium white ($TiO_2$, 99.5 wt %), charcoal (with 75% carbon content), and sulfur powder (99%) are mixed at a molar ratio of 1:2.5:2.3, in total amount of 10 g. The materials are mixed and milled in a star ball mill for 24 h, 5 g mixture is taken and pressed at 10 Mpa pressure into a small piece in dimensions of 10 mm diameter*10 mm, and is placed in a pressure-resistant and high temperature-resistant container, the container is loaded in a muffle furnace shielded by argon atmosphere, burning reaction is performed at 1,200° C. for 10 h, and then the temperature is lowered to room temperature; thus, TiS with carbon in a trace amount is obtained. The TiS is pressed and vacuum-sintered into a cylinder in dimensions of 10 mm diameter*3 mm. Relevant electrolysis experiments are carried out at 850° C. in a corundum crucible containing 150 g $CaF_2$—KF—NaF—$Na_2TiF_6$ eutectic molten salt. The sintered TiS is used as the anode, galvanostatic electrolysis is carried out at 0.05 A/cm$^2$ cathode current density, the spacing between the anode and the cathode is 10 cm; a titanium powder product is obtained on the nickel rod cathode after 4 h electrolysis. The cathode product is immersed in distilled water and washed with 1 wt % dilute hydrochloric acid, and then is dried. The final product is titanium powder in a homogeneous phase.

Embodiment 6

First, 500 g high titanium slag is sulfurized at 1,200° C., and the product obtained through the treatment is mixed powder of FeS and $TiO_2$. Then, the mixed powder is immersed in 1 mol/L dilute hydrochloric acid, vacuum-filtered, and then oven-dried at 80° C. to obtain titanium white powder ($TiO_2$). The titanium white ($TiO_2$, 99.5 wt %), petroleum coke (with 89% carbon content), and sulfur powder (99%) are mixed at a molar ratio of 1:2.3:2.2, in total amount of 10 g. The materials are mixed and milled in a star ball mill for 12 h, and 2 g mixture is taken and pressed into a small piece in dimensions of 5 mm diameter*5 mm under 10 Mpa pressure, and is loaded into a closed glass tube with one end sealed, and the glass tube is sealed with high temperature-resistant organic glue to ensure the glass tube is in a sealed state has no air leakage at high temperatures. Then the glass tube is placed in a muffle furnace, and burning reaction is performed at 1,000° C. for 10 h, and then the temperature is lowered to room temperature, and the glass tube is cut to take out the TiS material. The TiS is pressed and vacuum-sintered into a cylinder in dimensions of 10 mm diameter*3 mm. Relevant electrolysis experiments are carried out at 850° C. in a corundum crucible containing 150 g $CaF_2$—KF—NaF—$Na_2TiF_6$ eutectic molten salt. The sintered TiS is used as the anode, galvanostatic electrolysis is carried out at 0.5 A/cm$^2$ anode current density, the spacing between the anode and the cathode is 5 cm; a titanium powder product is obtained on the nickel rod cathode after 4 h electrolysis. The cathode product is immersed in distilled water and washed with 1 wt % dilute hydrochloric acid, and then is dried. The final product is titanium powder in a homogeneous phase.

The use of titanium sulfide and Ti—C—S composite as the soluble anode has the following distinctive features:

(1) It is possible to prepare a Ti—C—S anode (TiS, $TiS_2$, $Ti_2CS$, $Ti_2C_xS_{1-x}$, etc.) having metal conductivity at a low cost;

(2) The titanium sulfide used in the preparation of the Ti—C—S anode can be prepared by treating titanium-containing concentrate with CΩ gas produced in the electrolysis process, and thereby the problem of abandonment of titanium-containing raw materials such as vanadium-titanium magnetite, titanium white, titanium carbide, titanium nitride, titanium-carbon oxides, and titanium-carbon-nitrogen oxides, etc.;

(3) With the Ti—C—S composite and titanium sulfide as the soluble anode, in the electrolysis process, titanium is dissolved in the form of ions in the electrolyte, and $CS_2$ is discharged from the anode, recycled and reused; thus, efficient and comprehensive utilization of resources and energy is realized;

(4) Owing to the strong affinity of carbon with sulfur, the CΩ gas can be recycled at the electrolysis temperature;

(5) Through direct electrolysis in the electrolyte, metallic titanium having low oxygen content can be deposited at the cathode, and the gas produced at the anode can be recycled and efficiently utilized;

(6) The problem of free carbon in the electrolyte in the electrolysis process resulted from solely using a titanium carbide anode is effectively solved;

In summary, compared with existing soluble anodes, the Ti—C—S anode has advantages, including: the electrolysis efficiency is high, less intermediate products are produced, high-purity metallic titanium is directly obtained, the production is continuous, no anode mud is produced, the energy resource is utilized efficiently and the mineral is processed and utilized efficiently, etc.

The method for preparing metallic titanium by anode-electrolysis of a carbonized/vulcanized ilmenite provided in the embodiments of the present application is described in detail above. However, the above embodiments are described only to facilitate understanding the method and core idea of the present invention; those having ordinary skills in the art can make modifications to the embodiments and their scope of application on the basis of the idea of the present invention. In summary, the content of this document shall not be understood as constituting any limitation to the present application.

Some terms are used in the Description and Claims to refer to specific components. Those skilled in the art should understand that different hardware manufacturers may refer to the same component by different nouns. The Description and claims do not use the difference in the names as a means for differentiating components; instead, the he Description and claims use the difference in functionality of the components as a criterion for differentiation. As used throughout the Description and claims, "comprises" and "comprising" are used as an open term, and should be interpreted as "including, but not limited to". "About" means "within an acceptable error range", in which those skilled in the art can solve the technical problem and substantially achieving the technical effect. Although some preferred embodiments of the present application are described in the last part of the Description, the description of those embodiments is intended to explain the general principle of the present application rather than limit the scope of the present application. The scope of protection of the present application is only defined by the attached claims.

It should also be noted that the terms "comprise", "include" or any other variant thereof are intended to encompass non-exclusive inclusion, such that a product or system comprising a plurality of elements includes not only those elements but also other elements not listed explicitly, or further includes elements that are inherent to such a product or system. An element defined by the phrase "comprising a . . . " does not exclude the presence of additional identical elements in the product or system including the element, provided that there is no more confinement.

It should be appreciated that the term "and/or" as used herein is merely an association describing the associated objects, and indicates the potential existence of three relationships, for example, A and/or B, which may indicate three scenarios: A exists separately, A and B exist at the same time, or B exists separately. In addition, the character "/" used herein generally indicates that the contextual objects are in an "or" relationship.

Several preferred embodiments of the present application have been illustrated and described above, but as described above, it should be understood that the present application is not limited to the forms disclosed herein, and those embodiments should not be deemed as excluding other embodiments; instead, they may be used in various other combinations, modifications, and environments, and may be modified on the basis of the above teachings or techniques or knowledge in related arts within the scope of the inventive concept described herein. All variations and modifications made by those skilled in the art without departing from the spirit and scope of the present application should be deemed as falling in the scope of protection of the present application as defined by the attached claims.

The invention claimed is:

1. A method for preparing metallic titanium by anode-electrolysis of carbonized/sulfurized ilmenite, comprising the following steps:
    S1: sulfurizing a mixture comprising a titanium-containing material, a carbon-containing reducer and a sulfur reducer to prepare titanium sulfide;
    S2: using the titanium sulfide and titanium carbide as raw materials to prepare a Ti—C—S composite;
    S3: using the titanium sulfide or the Ti—C—S composite as an anode, and using electrochemical electrolysis to extract metallic titanium at the cathode; and
    S4: collecting $CS_2$ and $S_2$ gasses generated by the anode during the electrolysis and using them for sulfurizing the titanium-containing material.

2. The method for preparing metallic titanium by anode-electrolysis of carbonized/sulfurized ilmenite according to claim 1, wherein the mixture is a mixture obtained by homogenously mixing the titanium-containing material, the carbon-containing reducer, and the sulfur reducer at a molar ratio of 1:2.0:2.0-1:2.5:3.0.

3. The method for preparing metallic titanium by anode-electrolysis of carbonized/sulfurized ilmenite according to claim 1, wherein the conditions of the sulfurization reaction in the step S1 include: burning reaction shielded by an inert atmosphere, temperature range in the reaction is 700° C. -1,600° C., and reaction time range is 30 min-900 min.

4. The method for preparing metallic titanium by anode-electrolysis of carbonized/sulfurized ilmenite according to claim 1, wherein, in the step S2, the titanium sulfide and the titanium carbide are vacuum-sintered to prepare the Ti—C—S composite.

5. The method for preparing metallic titanium by anode-electrolysis of carbonized/sulfurized ilmenite according to claim 1, wherein, during the electrolysis in the step S3, an electrolysis temperature is 70° C. -1,600° C., a spacing between the cathode and the anode is 1 cm-50 cm, a voltage range of the electrolytic cell is 0.5V-10.0V, an anode current density range is 0.05 $A/cm^2$-1.50 $A/cm^2$, and a cathode current density range is 0.05 $A/cm^2$- 1.50 $A/cm^2$.

6. The method for preparing metallic titanium by anode-electrolysis of carbonized/sulfurized ilmenite according to claim 1, wherein the electrolyte used in the electrolysis in the step S3 is a salt mixture composed of one or more of $CsCl_2$, $CaCl_2$, LiCl, NaCl, KCl, $MgCl_2$, $AlCl_3$, CaF, NaF, KF, and LiF and one or more of $TiCl_3$, $TiCl_2$, $K_2TiF_6$, and $Na_2TiF_6$.

7. The method for preparing metallic titanium by anode-electrolysis of carbonized/sulfurized ilmenite according to claim 6, wherein a mass percent of titanium ions in the electrolyte is 1%-10%.

8. The method for preparing metallic titanium by anode-electrolysis of carbonized/sulfurized ilmenite according to claim 1, wherein the titanium-containing material is one or more of titanium dioxide, anatase type titanium white, titanium concentrate, titanium nitride, titanium carbide, titanium-carbon oxides, titanium-carbon-nitrogen oxides, metatitanic acid, ilmenite, vanadium titano-magnetite, blast furnace type high titanium slag, high titanium slag and titanium suboxides.

9. The method for preparing metallic titanium by anode-electrolysis of carbonized/sulfurized ilmenite according to claim 1, wherein the carbon-containing reducer is one or more of carbon, activated carbon, graphite powder, charcoal, petroleum coke, bitumen, and coal char particles.

10. The method for preparing metallic titanium by anode-electrolysis of carbonized/sulfurized ilmenite according to claim 1, wherein the cathode is one or more of metallic titanium, stainless steel, carbon steel, metallic molybdenum and metallic nickel.

* * * * *